July 29, 1952
E. M. WILLIAMS
2,605,398
QUENCHED OSCILLATING DETECTOR
Filed May 16, 1945
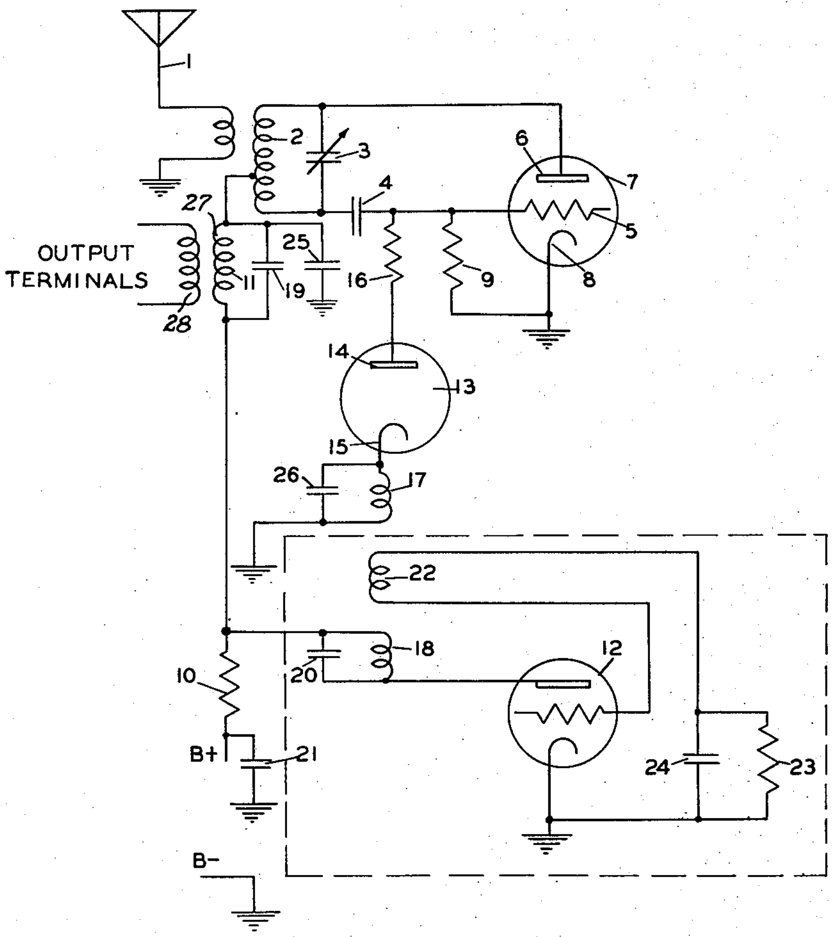
INVENTOR.
EVERARD M. WILLIAMS
BY William D. Hall
ATTORNEY Patented July 29, 1952 2,605,398

UNITED STATES PATENT OFFICE 2,605,398

QUENCHED OSCILLATING DETECTOR

Everard M. Williams, State College, Pa.

Application May 16, 1945, Serial No. 594,141

10 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio detectors and more particularly to a radio detector comprising a quenched oscillator as a part thereof.

Radio detectors of the superregenerative type or containing a quenched oscillator as a part thereof that have been devised and used heretofore are characterized by the limitation of a low quench rate or that the quenched oscillations do not decay sufficiently rapidly to clear the tube of oscillations between successive quench cycles. In the interests of sensitivity and selectivity it is desirable that the resonant circuit of the detector at signal frequency have a high Q at the start of each quench cycle during the increase in the plate voltage of the oscillator tube in the circuit. After the plate voltage ceases to rise, however, it is desirable that oscillations of the tube at signal frequency cease as rapidly as possible since the tube oscillations detract rather than contribute to the efficiency of detection during this portion of the quench cycle. The high Q of the resonant circuit is a disadvantage therefore in this phase of the cycle since it prolongs the time of the undersirable oscillation of the oscillator tube in the circuit.

The object of the present invention comprises the provision of an improved superregenerative or quenched oscillator detector, that is characterized by a sharp quenching action or rate that is particularly desirable in the detection of pulse signals.

With the above and other objects in view which will be apparent to those who are informed in the matter of radio signal detection from the following discussion, an illustrative schematic circuit diagram of a quenched oscillator detector that embodies the present invention is shown in the accompanying drawing.

In the circuit there shown, a receiving antenna 1 is inductively coupled through a transformer 2 to the grid 5 and plate 6 of an oscillation tube 7. A variable capacitor 3 connects the grid 5 and the plate 6 of the oscillation tube 7. The grid 5 of the tube 7 is isolated from the plate voltage supply of the tube by a blocking condenser 4 and is connected to the grounded cathode 8 of the tube 7 through a grid leak resistor 9. A plate voltage supply for the plate 6 of the tube 7 is received at the terminal B+ and is passed through a load resistor 10, the primary of a video transformer 11 and is applied from a variable tap on the secondary winding of the transformer 2 to the plate 6 of the tube 7. The terminal B+ is grounded through a condenser 21. The negative terminal of the plate voltage supply for the tube 7 is grounded at B—. The variable tap is grounded for radio frequency through a capacitor 25.

A separate quench signal oscillator 12 that oscillates at a frequency that is lower than that to which the circuit of the oscillation tube 7 oscillates also receives its plate supply voltage from the direct current terminal B+. The plate of the tube 12 is connected to the terminal B+ through a primary inductance winding 18 that is shunted by a condenser 20 and that is in series with the load resistor 10. One secondary winding 22, that is inductively coupled with the primary winding 18, connects the grid and cathode of the tube 12 through a grid resistor 23 and by-pass condenser 24 in the grounded cathode leg thereof.

A decay diode 13 has its cathode 15 grounded through a secondary winding 17 that is inductively coupled with the primary winding or oscillation coil 18 of the quench signal oscillator 12. The coil 17 is shunted by a radio-frequency by-pass capacitor 26. The plate of the diode 13 is connected to the grid 5 of the oscillator tube 7 through a resistor 16 that is of lower value than the grid leak resistor 9. The primary 27 of the video transformer 11 is shunted by a capacitor 19. The output terminals of the secondary winding 28 of the video transformer 11 provide the output terminals for the quenched oscillator detector.

In operation, radio frequency signal is intercepted by the antenna 1 and is fed inductively to the parallel tuned oscillating circuit that comprises the inductor coil 2 that is tuned by the variable capacitor 3 and that connects the grid 5 and the plate 6 of the oscillation tube 7.

The oscillation of the quench signal oscillator 12 develops an alternating voltage of quench signal across the load resistor 10, which is then passed through the by-pass capacitor 19 and is superposed upon the direct voltage supply to the plate 6 of the oscillation tube 7.

During one-half of the cycle of the quench signal, radio frequency oscillations build up in the circuit of the oscillation tube 7. During the other half of the quench cycle, the oscillations decay but the decay is retarded by the high Q of the resonant circuit which comprises the inductor 2 and the capacitor 3.

The diode 13 serves to accelerate the decay rate of the radio frequency oscillations of the quench signal during the second half of the quench cycle in opposition to the high Q of the resonant circuit. This acceleration of the decay rate of the quench signal is initiated by the coupling of the diode cathode secondary coil 17 with the lower frequency oscillation tube 12 in such a manner so that the voltage of the quench signal frequency that is induced in the coil 17 is in quadrature with the voltage of the quench signal frequency that is impressed upon the plate 6 of the oscillation tube 7.

The voltage that is induced into the coil 17 drives the cathode 15 of the diode 13 positive during the time that the quench signal voltage on the plate 6 of the oscillation tube 7 is increasing. The plate 14 of the diode 13 is at ground with respect to the voltage of quench frequency, so that as long as the cathode 15 of the diode 13 is positive, no current flows through the tube 13.

Due to the quadrature relation between the voltage of the quench signal frequency induced in the coil 17 and that impressed upon the plate 6 of the tube 7 when the quench signal on the plate 6 starts to decrease, the voltage of the cathode 15 of the diode 13 passes through zero and continues as a negative value. As a result the diode 13 becomes conducting and acts to insert a load resistance across that part of the oscillating coil 2 between grid 5 and ground. This puts a high damping load on the oscillations of coil 2. In other words the Q of the signal frequency oscillating circuit composed of coil 2 and capacitor 3 is reduced and the oscillations thereof are rapidly damped out. In addition diode 13 in the conducting state removes radio frequency excitation from the grid 5 and thus tends to stop oscillation of tube 7. The flow of current thru diode 13 also has the effect of driving the bias of grid 5 far negative. This also tends to stop oscillation of tube 7. In these three ways the diode tube 13 acts to quench the signal-frequency oscillations of the circuit associated with oscillator tube 7 more rapidly than would be accomplished otherwise.

This rapid and effectual damping out of the oscillations of the oscillation tube 7 enables a new oscillation cycle to start more promptly and substantially in the absence of conflicting residual oscillations. This improved function also permits the use of a higher frequency of quench signal than could otherwise be normally used and materially improves the detection efficiency of the quenched oscillator detector that is contemplated hereby.

The detector action of the quenched oscillator detector that is contemplated hereby is substantially normal with the exception of the improvements that are set forth herein. The detected signal in the plate current of the oscillation tube 7 appears across the primary of the video transformer 11 and accordingly across the output terminals of the secondary winding thereof. In the situation where the antenna 1 receives pulsed radio frequency signals, the video transformer 11 provides a suitable output transformer for the quenched oscillator detector.

It is to be understood that the circuit and the components thereof that have been disclosed and described herein have been submitted for the purposes of illustrating and describing an operative embodiment of the present invention and that comparable modifications, changes and substitutions therein may be made without departing from the scope of the present invention as defined by the appended claims.

What I claim is:

1. In a superregenerative detector system having first and second oscillator tubes each having at least an anode, cathode, and grid electrode, and means applying the output of said second oscillator tube to said first oscillator tube for building up and then quenching the oscillations of said first oscillator tube in accordance with the positive and negative alternations respectively of the output of said second oscillator tube; apparatus for accelerating the quenching rate comprising a unilateral impedance coupled between said first tube grid and a point of fixed potential, means for phase shifting the output of said second tube 90°, and means for applying said phase shifted output of said second tube to said impedance to render said impedance non-conducting only during the entire portion of each cycle of the output of said second tube in which the slope of the amplitude change has a given sign, and conducting only during the entire portion of each cycle in which the slope of the amplitude change of said output has the opposite sign.

2. The apparatus recited in claim 1, wherein said means for phase shifting the output of said second oscillator tube 90° comprises a coil connected in series with said unilateral impedance, said coil arranged to be inductively coupled to said second oscillator tube to derive from said coil oscillations in quadrature with the oscillations produced by said second oscillator tube.

3. The system recited in claim 1, wherein said impedance comprises a damping circuit having a diode having at least an anode and cathode, a resistor in series with said diode anode, and a parallel combination comprising a capacitance and an inductance coupled to said second oscillator tube, said parallel combination being in series with said diode cathode, said circuit being coupled between said first tube grid and a point of fixed potential.

4. A superregenerative detector system having an acelerated quench period comprising a first and a second oscillator tube each having at least anode, cathode, and grid electrodes, means for applying oscillations from said first oscillator tube in series with the anode-cathode path of said second oscillator tube to render said second tube alternately oscillating and non-oscillating in accordance with said first tube oscillation frequency, a resistor connected to said second tube grid, a diode tube having at least an anode and a cathode, said resistor connected in series with said diode anode, a condenser connected in parallel with an inductance, said parallel combination connecting said diode cathode to a point of fixed potential, means for inducing oscillations from said first tube in said inductance to derive therefrom oscillations in quadrature with the oscillations of said first tube applied to the anode-cathode of said second tube.

5. A superregenerative detector comprising a first oscillator including a frequency-determining circuit therefor, an alternating source of quenching voltage, means applying said quenching voltage to said first oscillator for rendering said first oscillator alternately oscillating and quenched in accordance with the positive and negative alternations respectively of said quenching voltage, a damping circuit for said frequency-determining means including a unilateral conducting device, means for phase shifting said quenching voltage 90°, and means applying said phase shifted quenching voltage to said unilateral conducting device for rendering said circuit inoperative only during the entire portion of each cycle of the quenching voltage in which the slope of the amplitude change has a given sign and operative only during the portion of each cycle of said quenching voltage in which the slope of the amplitude change has the opposite sign.

6. A superregenerative detector according to claim 5, wherein said source of quenching voltage produces a sine wave voltage.

7. A superregenerative detector according to claim 6, wherein said coupling means for phase shifting said quenching voltage 90° comprises inductive means to derive a voltage in quadrature with said quenching voltage.

8. A superregenerative detector according to claim 5, wherein said unidirectionally conducting device shunts at least a portion of said frequency-determining means.

9. A superregenerative detector comprising an oscillator, said oscillator including an electron tube having at least a cathode, a grid, and an anode, a resonant circuit for regeneratively coupling the plate-cathode circuit of said electron tube to the grid-cathode circuit thereof, and means for applying a positive direct voltage to the plate of said tube; a source of sine wave voltage; means for superimposing said sine wave voltage on said positive direct voltage applied to the plate of said tube, whereby said oscillator is rendered oscillating during the positive excursions of said sine wave voltage and quenched during the negative excursions of said sine wave voltage; a unidirectionally conducting damping circuit shunting the grid-cathode circuit of said tube, said unidirectionally conducting damping circuit including a coil inductively coupled to said source of sine wave voltage for rendering said unidirectionally conducting device non-conducting during the entire portion of each cycle of said sine wave voltage in which the amplitude changes in a positive direction and conducting during the entire portion of the cycle of said sine wave voltage in which the amplitude changes in a negative direction; whereby the oscillations of said oscillator are more quickly quenched.

10. A superregenerative detector according to claim 9, wherein said unidirectionally conducting damping circuit includes a second eelctron tube having at least a cathode and an anode, a resistor connecting the anode of said second tube to the grid of said oscillator electron tube, and said coil connecting the cathode of said second electron tube to the cathode of said oscillator electron tube.

EVERARD M. WILLIAMS.

REFERENCES CITED

The following references are of record in the file of this patent:

UNITED STATES PATENTS

| Number | Name | Date |
|---|---|---|
| 2,230,108 | Gerhard | Jan. 28, 1941 |
| 2,351,193 | Crosby | June 13, 1944 |
| 2,410,768 | Worcester | Nov. 4, 1946 |
| 2,412,710 | Bradley | Dec. 17, 1946 |
| 2,481,852 | Loughlin | Sept. 13, 1949 |